United States Patent [19]

Krummheuer et al.

[11] Patent Number: 5,131,434
[45] Date of Patent: Jul. 21, 1992

[54] MANUFACTURE OF AN AIR BAG FABRIC

[75] Inventors: Wolf R. Krummheuer, Wuppertal; Hans A. Graefe, Schwelm; Volker Siejak, Duisburg, all of Fed. Rep. of Germany

[73] Assignee: Akzo N.V., Netherlands

[21] Appl. No.: 756,975

[22] Filed: Sep. 9, 1991

[30] Foreign Application Priority Data

Sep. 8, 1990 [DE] Fed. Rep. of Germany ....... 4028636
Jul. 25, 1991 [DE] Fed. Rep. of Germany ....... 4124610

[51] Int. Cl.$^5$ ............................................. D03C 13/00
[52] U.S. Cl. ................... 139/35; 139/116.1; 139/383 R; 280/743
[58] Field of Search ................. 280/743; 139/389, 109, 139/383 R, 116.1, 35

[56] References Cited

U.S. PATENT DOCUMENTS

| | | | |
|---|---|---|---|
| 592,057 | 10/1897 | Knight | 139/389 |
| 3,360,014 | 12/1967 | Poisson et al. | 139/389 |
| 3,451,693 | 6/1969 | Carey | 280/739 |
| 3,481,625 | 12/1969 | Chute | 280/739 |
| 3,937,488 | 2/1976 | Wilson et al. | 280/736 |
| 4,840,397 | 6/1989 | Katz et al. | 280/739 |
| 4,963,412 | 10/1990 | Kokeguchi | 428/137 |

FOREIGN PATENT DOCUMENTS

| | | |
|---|---|---|
| 0363490 | 4/1990 | European Pat. Off. . |
| 0436950A2 | 12/1990 | European Pat. Off. . |
| 2122704 | 11/1971 | Fed. Rep. of Germany . |
| 1780304 | 4/1972 | Fed. Rep. of Germany . |
| 90/09295 | 8/1990 | PCT Int'l Appl. . |

OTHER PUBLICATIONS

Engineering with Fibres for Airbags—Wolf Krummheuer, Bag & Belt '90, Cologne/F.R.G., Apr. 25-27, 1990, pp. 1-19.

Primary Examiner—Kenneth R. Rice
Attorney, Agent, or Firm—Oliff & Berridge

[57] ABSTRACT

An air bag fabric has zones of differing air permeability which are variable in shape and size. A dobby, tappet or Jacquard machine may be used to weave, into a fabric having tight basic weave, window-like zones with a weave which differs from the basic weave, as a result of which these zones have a high air permeability. The zones of low air permeability are arranged in such a way that later they form the edges of cuts and seams. It is further possible to manufacture fabrics which have zones of differing air permeability by alternating sections of high warp or weft sett with sections of low warp or weft sett. The fabrics of the invention are suitable in particular for the filter part of air bags.

13 Claims, 10 Drawing Sheets

MANUFACTURE OF AN AIR BAG FABRIC

BACKGROUND OF THE INVENTION

The invention relates to a process for manufacturing an air bag fabric.

Air bag fabrics are customarily required to have on the side which faces the occupants of the motor vehicle a low air permeability which should not exceed values of 10 l/dm$^2$.min for a test pressure differential of 500 Pa. If an air bag is manufactured from such a fabric alone, then the air cushion produced when the air bag is inflated through ignition of the pyrotechnical gas generator is very hard. With a very hard air cushion there is a danger that the driver or front-seat passenger, who was initially violently flung forward at the moment of impact, will be abruptly flung backward, which may give rise to injuries, in particular in the head and neck region.

It is therefore necessary to construct the air bag in such a way that soft cushioning of the vehicle occupants is possible on impact without any danger of rebounding. This can be achieved if the gas which flows into the air bag on release of the air bag function is allowed to partially escape.

U.S. Pat. No. 3,481,625 proposes in relation to this matter that the air bag be provided with holes. However, this means that hot particles will pass from the generator-produced gas into the passenger compartment. They represent a considerable danger to the vehicle occupants.

To avoid the emergence of these particles it was proposed in German Patent No. 36 44 554 that the openings provided for the escaping gas be covered with a filter fabric made of aramid fibers. This requires the appreciable manufacturing expense of sewing in the filter fabric. This additional operation and the high cost of aramid fabrics increase the costs of manufacturing an air bag to such an extent as to make economical production impossible.

It was therefore proposed (Krummheuer W. R., Engineering with Fibres for Airbags, Bag and Belt '90, International Akzo Symposium, Cologne, Apr. 25-27, 1990) to make a two-part air bag, consisting of a contact part and a filter part. The contact part is made of a fabric of very low air permeability (<10 l/dm$^2$.min). The contact part is that part of the air bag which serves to cushion the vehicle occupants in the event of an accident.

The filter part forms those parts of the inflated air bag which do not face the driver or front-seat passenger. It is made of a fabric of distinctly higher air permeability, which thus makes it possible for the generator-produced gas to escape and filters the emerging gas. Moreover, as the hot gas passes at this point through the fabric, there is also a heat exchange effect, so that the gas passes into the passenger compartment in a somewhat cooler state.

European patent application No. 0 363 490 proposes making a one-part air bag by circular weaving. However, circular-woven air bags, in contradistinction to air bags consisting of two or more parts, do not permit adaptation to the specific vehicle type. For instance, given the present-day requirements relating to the construction of front-seat passenger air bags, it is in fact not possible to make it in one piece; instead, it is absolutely unavoidable that two or more pieces have to be sewn together. Moreover, the necessary sewing-in of holding cords is significantly more difficult in the case of a one-piece air bag than in the case of a two- or multipiece air bag.

International patent application WO 90/09295 likewise describes a one-piece air bag made up of woven fabric components having different air permeabilities. Again, using the process described there it is not possible to manufacture front-seat passenger air bags.

Although air bags made of two or more parts are very adaptable to the requirements of the particular vehicle type and even permit the easy construction of front-seat passenger air bags, the problem arises that two fabrics having very different air permeabilities need to be sewn together. Since the high permeability of the fabric used for the filter part of the air bag is achieved with a less tight weave whereas the contact part of the air bag is made of a tight weave, it is thus necessary here to sew together two fabrics which differ in tightness. As the air bag inflates, it is possible for the less tightly woven fabric to burst open at the seams or for the yarns of the less tightly woven fabric to slip, which may result in an uncontrolled escape of gas.

Moreover, this method of working presents planning problems in weaving, since the air permeability of the filter part must be adapted to the type of vehicle and to the generator used. It is thus necessary for the weaving mill to produce or keep available a large number of fabrics of different tightness.

SUMMARY OF THE INVENTION

An object of the invention was to develop a manufacturing process for a fabric which when used in the filter part of an air bag does not have the abovedescribed disadvantages and which is very inexpensively adaptable to the requirements of individual types of vehicles, but which also provides a specific means of escape of the generator-produced gas and which exerts a filtering and cooling effect on the gas.

This and other objects are achieved by manufacturing a fabric in which zones of lower and higher permeability which are variable in shape and size are produced by the weaving process. The creation of zones of differing air permeability according to the invention provides a particularly advantageous way of circumventing the above-described disadvantages. By using a filter part manufactured according to the invention it is possible to meet the air bag requirements in full.

The tighter fabric zones exhibit low air permeability. Owing to the high cut-edge and seam strength obtained here, they form the areas for cutting. The less tight zones of higher air permeability arranged within the fabric in the form of windows make it possible for the generator-produced gas used to inflate the air bag to escape in a controlled manner while being cooled. These areas are hardly suitable for the edges of cuts and seams.

The zones of lower air permeability are arranged within the fabric produced for the filter part of the air bag in such a way that, when the fabric is cut for the later making-up of the air bag, they will inevitably form the seam areas. The areas, which are tighter here, ensure that the seam obtained on sewing the filter part of the air bag together with the contact part will be very strong and that it will not give rise to tears or yarn slip upon inflation of the air bag. Moreover, the tight areas at the edges of the cut piece ensure advantages in cutting, since the result is a good cut-edge without fraying.

The higher and lower air permeabilities can be achieved by varying the type of weave or by varying the warp and weft sett. For instance, with the former approach the basic weave can be a tight plain weave. The fabric sett and finishing conditions are chosen in such a way that in those areas where the basic weave is to remain unchanged the air permeability is low and hence, because the fabric is tight there, a good cut-edge and seam strength is achieved. In those areas which are not to form the edges of seams or cuts and where the generator-produced gas is to escape, the weave of the fabric is altered in such a way as to produce zones of higher air permeability there.

The type of weave chosen for this purpose depends on the particular range of machinery available and on the air permeability requirements. To achieve zones of higher air permeability using a type of weave which differs from the basic weave, the invention is not restricted to a certain type of weave. Any known type of weave is suitable. Specific examples of a type of weave for the zones of higher air permeability when the basic weave is a plain weave include twill and Panama.

BRIEF DESCRIPTION OF THE DRAWINGS

FIG. 1 and FIG. 2 show how the weave design can be varied with the aid of a dobby mechanism in order to obtain zones of higher air permeability.

DETAILED DESCRIPTION OF PREFERRED EMBODIMENTS

One way of obtaining zones of differing weave and hence higher air permeability is available with the tappet and dobby machines, which are generally known in weaving technology. The dobby mechanism can be attached to any desired weaving machine. It makes it possible to control the movement of the heald shafts of the weaving machine in such a way as to achieve weave designs of various kinds within a woven fabric. The tappet machine can be used in the same way.

Figure 1A:
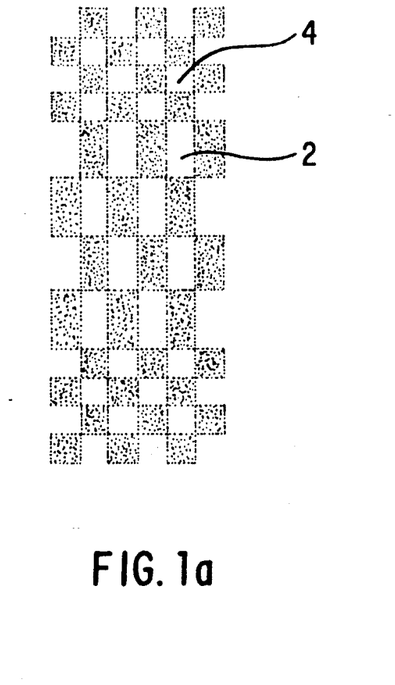
FIG. 1a shows the weave diagram of the basic fabric in a tight plain weave (1) with a Panama-woven window-like zone (2).
Figure 1B:
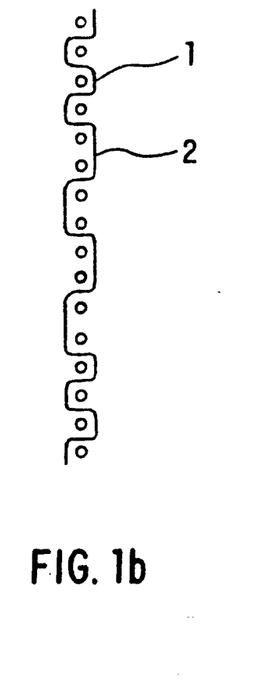
FIG. 1b shows the corresponding fabric in section.
Figure 2A:
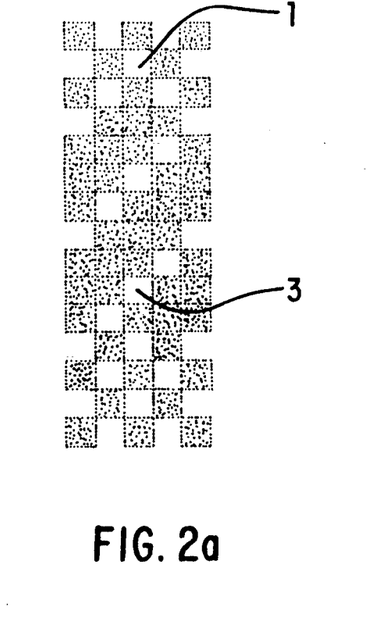
FIG. 2a shows the weave diagram of the basic fabric in a tight plain weave (1) with a 3/1-twill-woven window-like zone (3).
Figure 2B:
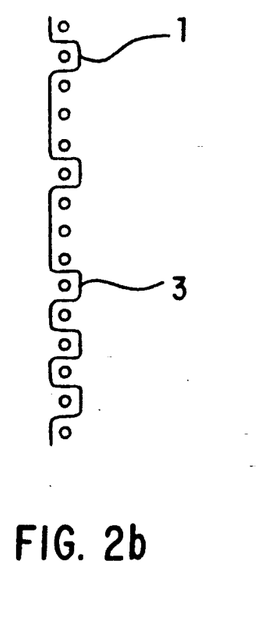
FIG. 2b shows the corresponding fabric in section.

FIG. 1 and FIG. 2 show how the weave design can be varied with the aid of a dobby mechanism in order to obtain zones of higher air permeability.

FIG. 1a shows the weave diagram of the basic fabric in a tight plain weave (1). A window was woven into it with the aid of a dobby machine in a Panama weave (2). FIG. 1b shows the corresponding fabric in section. The Panama-woven window-like zone gives a higher air permeability.

FIG. 2a shows the weave diagram of the basic fabric in a tight plain weave (1). A dobby machine was used to weave a window into it in a 3/1 twill weave (3). FIG. 2b shows the corresponding fabric in section. The twill-woven window-like zone gives a higher air permeability.

The areas in a tight basic weave are prearranged in the plan of the fabric in such a way that, when the fabric is later cut to size for the filter part of the air bag, they will inevitably form the edges of cuts and seams. The outline of the cut forms the edge of the zone of low air permeability or lies within that zone. The areas of higher air permeability woven in a weave which differs from the basic weave permit a controlled escape of the gas produced by the generator in the course of air bag inflation combined with a good filtering and cooling effect.

The degree to which the air permeability can be influenced by changing the weave plan is shown below by the table. A fabric woven in a plain weave with 20 threads/cm (470-dtex 72-filament nylon 66 yarn) in warp and weft was modified with the aid of a dobby machine by weaving windows of various designs into it. The individual designs gave the following air permeabilities:

| Weave design | Air permeability $l/dm^2 \cdot min$ |
| --- | --- |
| Basic plain weave | 9 |
| 2/2 Warp rib | 40 |
| 2/2 Panama | 54 |
| Huckaback | 64 |
| Fancy weave | 79 |
| 3/1 Twill | 87 |
| 2/2 Twill | 135 |
| Mock leno | 150 |

This table shows that the air permeability can be controlled in a very specific manner not only via the size of the zones of different weave but also via the choice of type of weave.

The need to locate the seam areas into the zones of low air permeability, i.e., in the instant case into the zones of the tight plain basic weave, is demonstrated by an investigation of the same strength and the seam slip resistance:

|  | Basic plain weave | 2/2 Panama weave |
| --- | --- | --- |
| Seam strength |  |  |
| Strength N | 1210 | 840 |
| Extension % | 18.9 | 29.1 |
| Seam Slippage in mm under load |  |  |
| 5 daN | 0 | 4.5 |
| 10 daN | 0 | not measurable |

In the case of the Panama weave the seam had already been ripped out to such an extend under a load of 10 dan as to make any measurement impossible.

To make zones in a different weave pattern and hence with higher air permeability it is also possible to use a Jacquard weaving machine of the type generally known in weaving technology. The Jacquard weaving machine has the advantage over dobby and tappet machines that the healds can be controlled individually, whereas with the dobby machine the healds are controllable only in groups. By using a Jacquard machine it is thus possible to vary the weave patterns in such a way that they can be optimized to the shapes required for the air bag. When deciding the fabric plan the areas with the tight basic weave are chosen in such a way that, in the cutting to size of the filter part of the air bag, they inevitably form the edges of cuts and thus the later edges of seams. This method of working results in absolutely minimal cutting waste, which has a particularly beneficial effect on production costs.

Figure 3A:
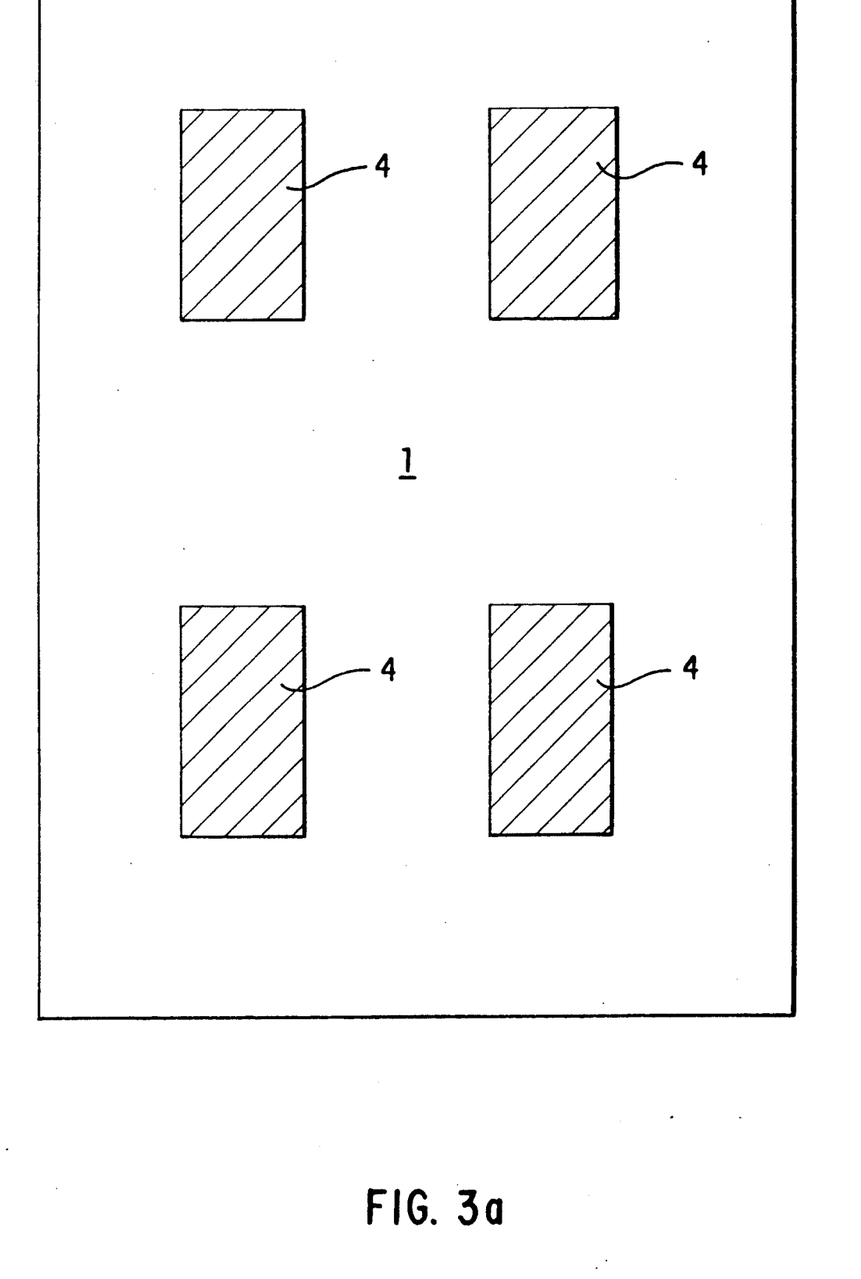
FIG. 3a shows a fabric section with zones of higher air permeability produced by modifying a tight basic plain weave using a dobby machine.

The fabric section shown in FIG. 3a with zones of higher air permeability (4) were produced by modifying a tight basic plain weave (1) and by introducing windows of a different weave pattern into it with the aid of a tappet or dobby machine. The plain-woven areas form the later edges of cuts and seams. The differently woven areas permit a controlled escape of the generator-produced gas combined with a very thorough filtering and cooling effect.

Figure 3B:
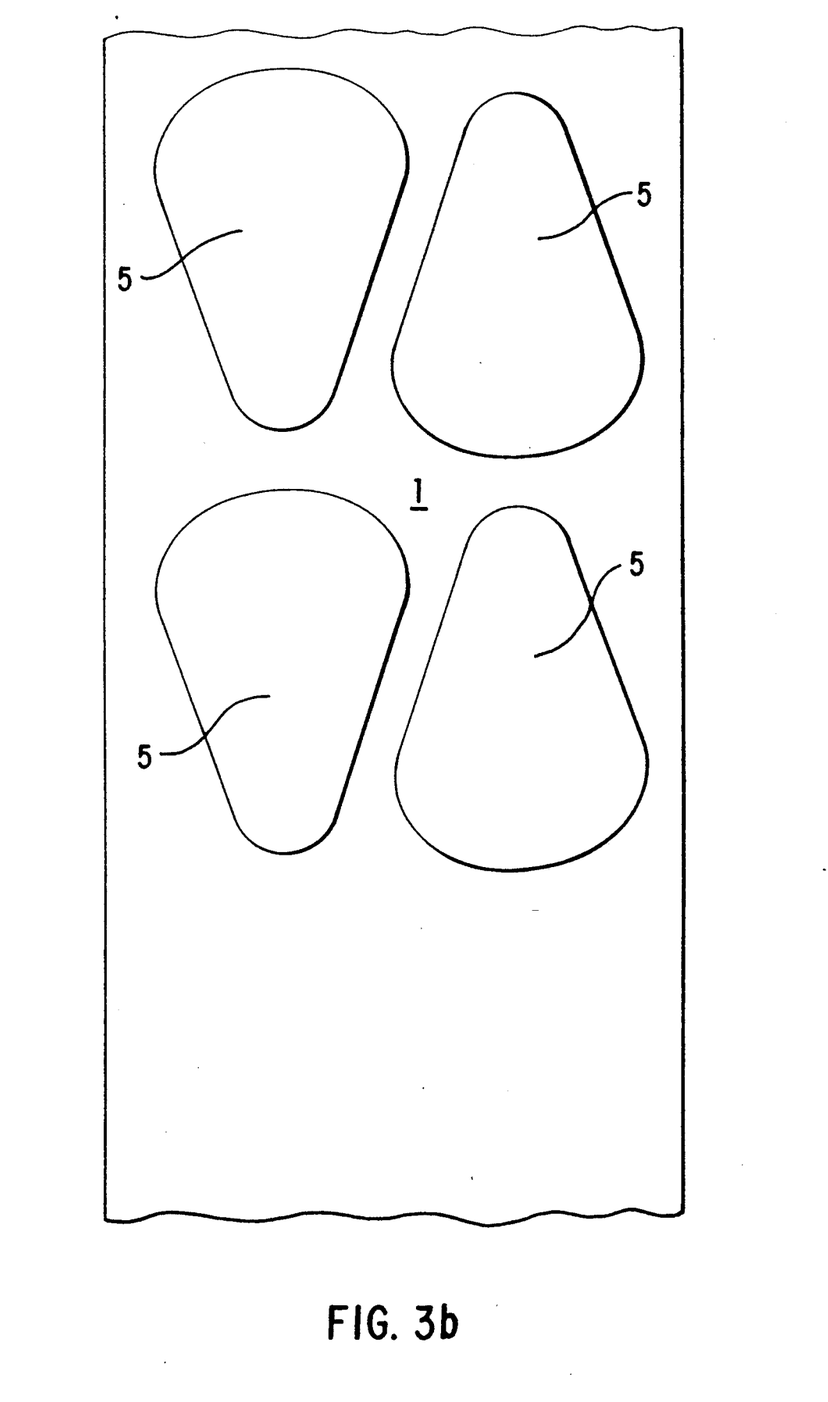
FIG. 3b shows a fabric section with zones of higher air permeability produced by modifying a tight basic plain weave using a Jacquard machine.

The fabric section shown in FIG. 3b with zones of higher air permeability (5) were produced by modifying a tight basic plain weave (1) by introducing windows of a different weave pattern into it with the aid of a Jacquard machine. The plain-woven areas form the later edges of cuts and seams. The differently woven areas permit a controlled escape of the generator-produced gas combined with a very good filtering and cooling effect. As the drawing shows, if a Jacquard machine is used the zone of higher air permeability can be constructed in such a way as to adapt it optimally to the cut-out shapes required for the filter part of the air bag, so that the later cutting-out will produce only an absolutely minimal amount of waste, ensuring highly economical construction.

The process described makes it possible to produce differently usable fabrics from one and the same warp, which, given the need to adapt the air bag fabrics to the various vehicle types and to the different air permeability requirements, makes very economical fabric manufacture possible.

The process of the invention is not restricted to introducing a window-like zone of higher air permeability into the shape for the filter part of an air bag. In fact, the same method can be used to introduce a plurality of window-like zones into each shape. The number of these windows, their arrangement within the shape and their size depend on the particular air permeability requirements and on the type of vehicle.

From a fabric construction point of view it is advantageous to arrange the windows not in succession, viewed over the fabric length, but offset in order to balance out the tensions created by the variation in weave pattern. Another way of balancing out these tensions is to use a second warp.

As well as using the dobby or Jacquard machine as described, it is possible to produce zones of differing shape, size, air permeability and cut-edge or seam strength in a fabric by varying the warp and weft sett. This is done by using warps in which sections having a large number of ends per cm in the reed alternate with sections having fewer ends per cm. This warp is interlaced in a plain weave. The weft sett is chosen in such a way that, in the same way as with the warp, sections having a larger number of picks per cm are systematically alternated with sections having fewer picks per cm with the aid of electronically controlled weft insertion.

The high warp sett sections have 22–28 ends/cm, and the low warp sett sections contain 17–21 ends/cm. High and low weft sett sections are produced in the same way with corresponding numbers of picks per cm. The stated values are examples of loom state setts. They are based on a yarn count of 350 dtex. If other yarn counts are used, the numbers of picks and ends must be appropriately adapted to the count. Similarly, the numbers of picks and ends per cm must be adapted to the shrinkage characteristics of the yarns used.

Varying the warp and weft setts produces three groups of air permeabilities in the fabric. Areas where sections of high warp sett are interlaced by sections of high weft sett possess low air permeability but good cut-edge and seam strength. The fabric plan is constructed in such a way that the later cut-out of the filter part of the air bag preferably takes place in these areas, since in these areas there is no danger of the seams breaking or of slippage of the yarn layers at the seam upon air bag inflation.

Areas where sections of low warp sett come together with sections of low weft sett possess high air permeability. These areas are not suitable for later cutting or sewing. However, they do permit controlled escape of the generator-produced gas as the air bag inflates and they exert a very thorough filtering and cooling effect on this gas.

Furthermore, the areas where sections of high warp sett coincide with sections of low weft sett or where sections of low warp sett coincide with sections of high weft sett possess medium air permeability.

Figure 4:
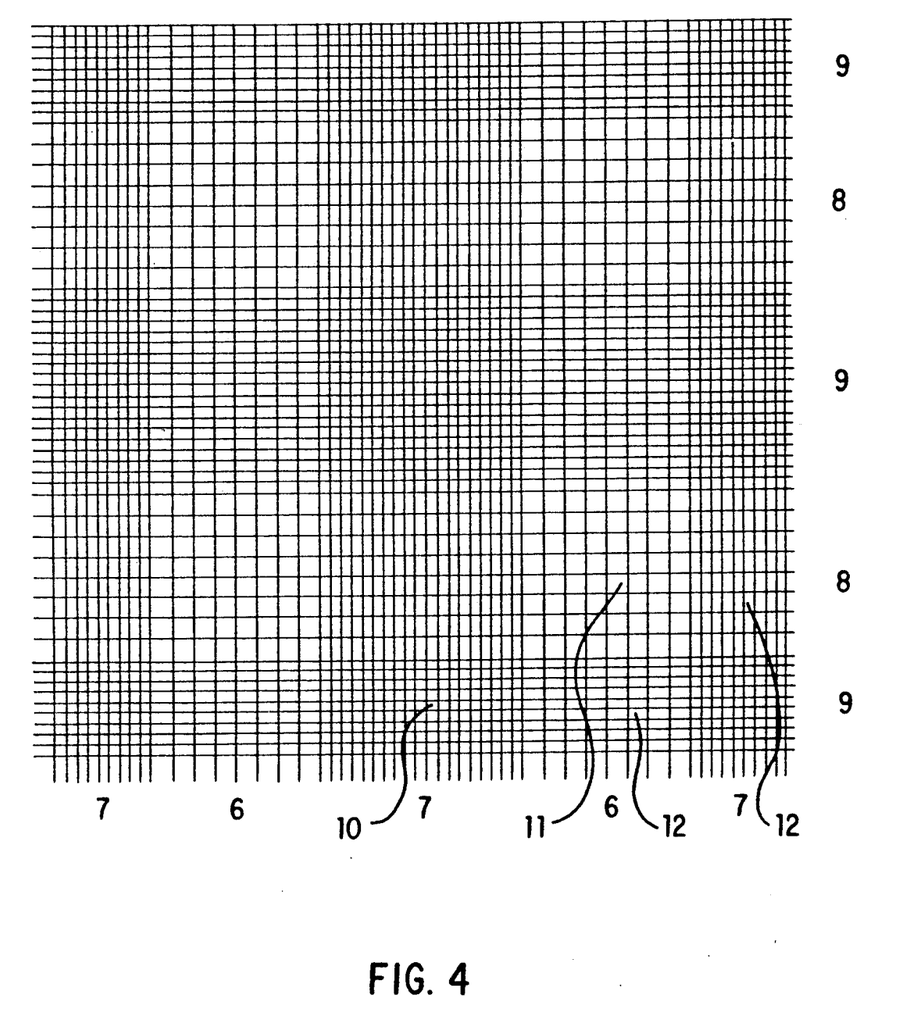
FIG. 4 shows a fabric produced by varying the warp and weft setts.

The warp of FIG. 4 has a section of low sett (6) next to a section of high sett (7). Similarly, the weft has a section of low sett (8) next to a section of high sett (9). The result is that, on plain weaving, the areas where sections of high warp sett (7) cross sections of high weft sett (9) are zones of low air permeability (10). These zones are chosen in such a way that, when the filter part of the air bag is cut out later, they would preferably form the location for the cut and the later seam. Furthermore, zones of high air permeability (11) are formed in areas where sections of low warp sett (6) cross sections of low weft sett (8). These areas form the filter areas in the filter part of the air bag. They permit a controlled escape of the generator-produced gas combined with a thorough filtering and cooling effect. Finally, zones of medium air permeability are produced in the areas (12) where sections of low warp sett (6) cross sections of high weft sett (9) and in the areas (12) where sections of high warp sett (7) cross sections of low weft sett (8).

This process makes it possible to use any desired loom without having to resort to attachments.

The degree to which the air permeability can be influenced by forming zones of lower sett is shown below in the table. The results shown there were obtained with a 470-dtex 72-filament nylon 66 yarn:

| Threads/cm | | Corresponding | Air permeability |
| --- | --- | --- | --- |
| Warp | Weft | zone in FIG. 4 | l/dm² · min |
| 20 | 20 | 10 | 9 |
| 15 | 15 | 11 | 107 |
| 20 | 15 | 12 | 62 |
| 15 | 20 | 12 | 66 |

The manufacture of fabrics by the novel process described herein is not restricted to fabrics for the filter part of an air bag. The process can be applied to any desired woven fabric where different air permeabilities or different seam strengths are required. The novel process is particularly suitable for manufacturing industrial fabrics where a filtering effect, for example: for gases, which varies zone by zone is required. The process is ideally suited for manufacturing fabrics for the filter part of an air bag.

To carry out the process of the invention it is possible to use any desired yarn. Particularly suitable yarns for air bag fabrics are for example nylon 66 filament yarns. These yarns can be used in counts of 235 dtex 36 filaments, 350 dtex 72 filaments, 470 dtex 72 filaments or 940 dtex 140 filaments. However, it is also possible to use other counts.

The fabrics are shrinkage-relaxed and adjusted to the desired air permeability by a wet treatment process as described in German Patent Application No. P 40 00 740.5.

The fabrics manufactured according to the invention, when used as the filter part of an air bag by being sewn together with a fabric of air permeability <10 l/dm².min, which forms the contact part of the air bag, produce an air bag which provides safe cushioning of the vehicle occupants in the event of a collision without the risk of additional injuries.

Figure 10:
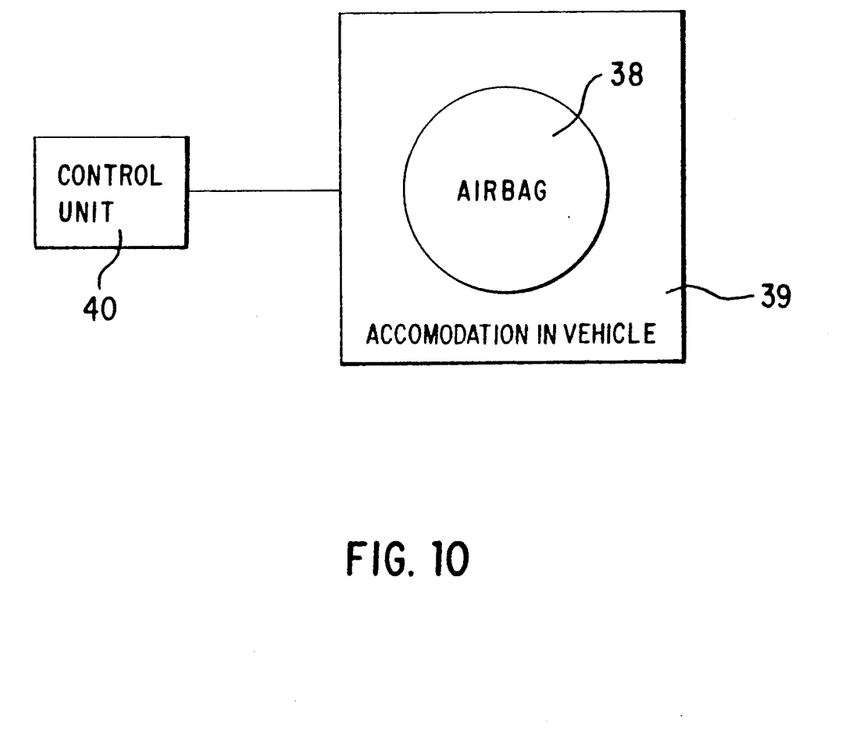
FIG. 10 shows a schematic representation of an air bag system.

Air bags which contain the fabrics produced according to the invention in the filter part make it possible to install in the motor vehicle an air bag system which is safe and conforms to the requirements of the automotive manufacturers—"air bag system" as shown in FIG. 10 is here defined as: the air bag 38 itself; its accommodation in the motor vehicle 39; and the control system 40 for releasing the air bag function.

METHOD OF TESTING AIR PERMEABILITY

The air permeability test method is in line with DIN 53 887. The only departure from this standard is that the test pressure differential is raised to 500 Pa in order that a clear signal may be obtained even at low air permeabilities. All the air permeabilities reported herein were determined at this test pressure differential, including those where this fact may not be expressly mentioned.

METHOD OF TESTING SEAM STRENGTH

Figure 5:
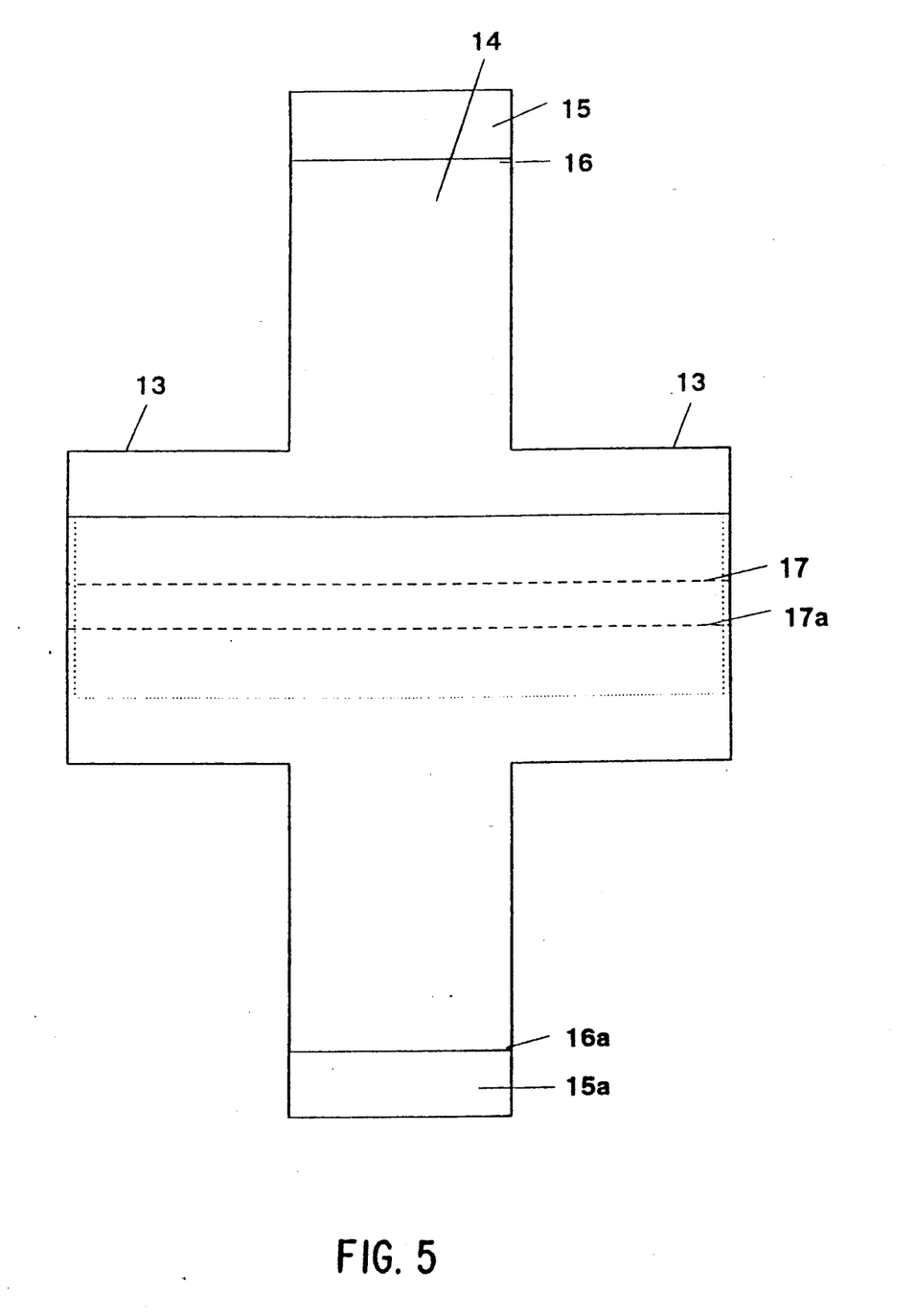
FIG. 5 shows a schematic drawing of the test specimen for examining the seam strength.

Two T-shaped specimens are cut out of the in-test material. FIG. 5 shows a sketch of the arrangement of these test specimens. The total width of 15 cm divides into 5 cm each for the side pieces (13) and 5 cm for the central piece (14). The zones 15 and 15a form the areas where the clamps are applied in the test, the distance between the clamps being the distance between 16 and 16a: 20 cm. The two test specimens overlap in the wide central part. Two seams (17, 17a) are sewn in with a distance of 1 cm between them using a needle 1.1 mm in diameter and 3–4 stitches per cm. The sewing yarn used for this purpose is 3×250 dtex polyester filament yarn.

The test is carried out on a laboratory tensile tester at an extension rate of 200 mm/min.

METHOD OF TESTING SEAM SLIP RESISTANCE

Figure 6:
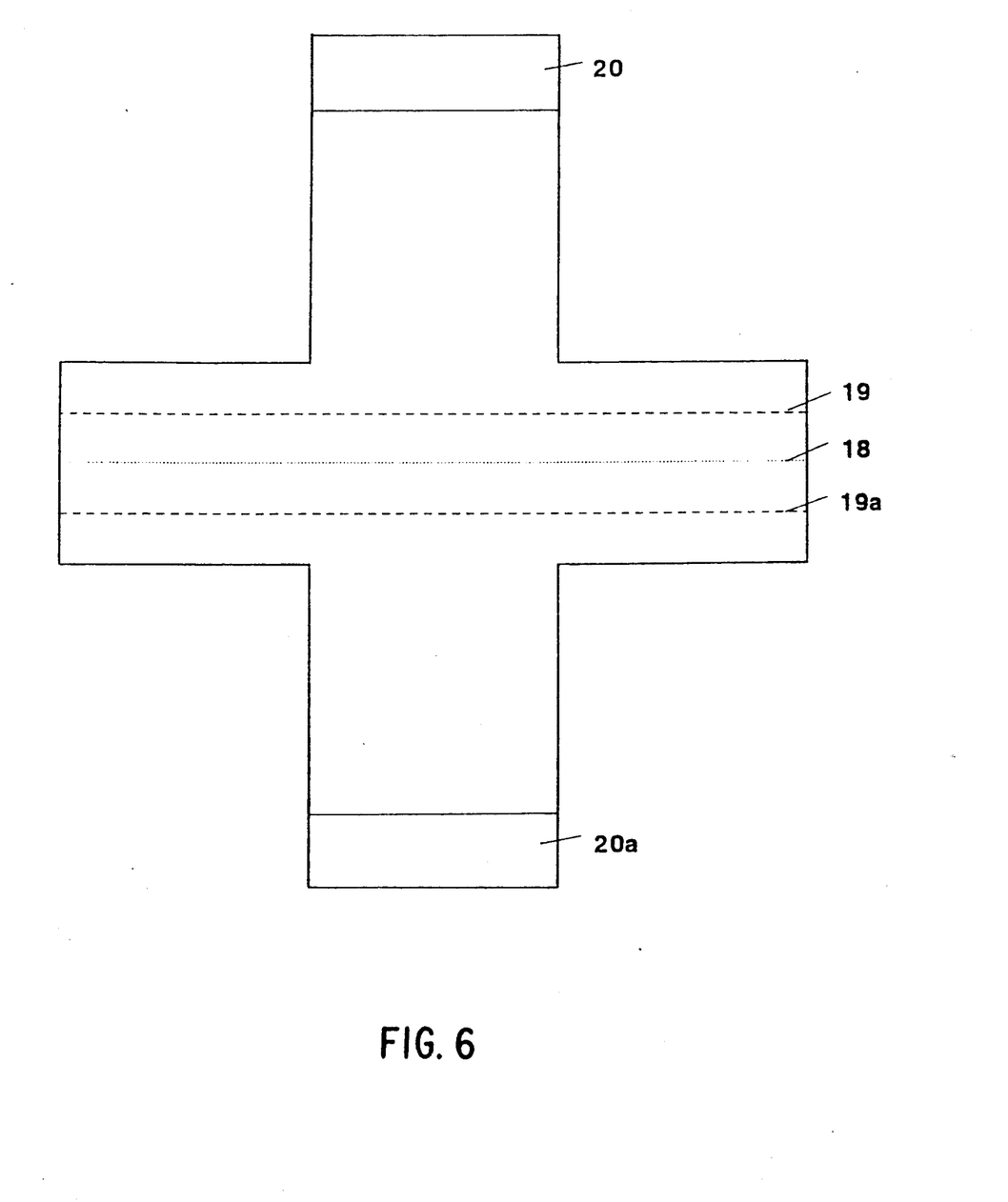
FIG. 6 shows a schematic drawing of the test specimen for examining the seam slip resistance.

A piece is cut out of the in-test material in the shape of a double T, as shown in FIG. 6. The piece is folded along line 18. A seam is introduced into the folded-over test material along lines 19 and 19a. The distance from line 18 to lines 19 and 19a is 1 cm in each case; similarly, the distance from lines 19 and 19a to the edge of the specimen is 1 cm in each case. The sewing conditions correspond to those described in the seam strength test. The test material is then cut open along line 18. The material is clamped into a laboratory tensile tester at 20 and 20a. The two sewn-together samples are subjected to extension rate of 100 mm/min and the extent to which the seam join comes apart is read off after loads of 5 and 10 dan.

The illustrative embodiments which follow describe possible ways of carrying out the process of the invention. The window arrangement and the shape of the cutouts specified therein must not be taken as limiting. They are examples which can be modified in a great number of ways and be optimally adapted to particular requirements.

EXAMPLE 1

A 470-dtex 72-filament nylon 66 yarn is processed on a gripper loom into a plain-weave fabric. The total width of the fabric is 180 cm, and it has 19 threads/cm in both warp and weft.

Figure 7:
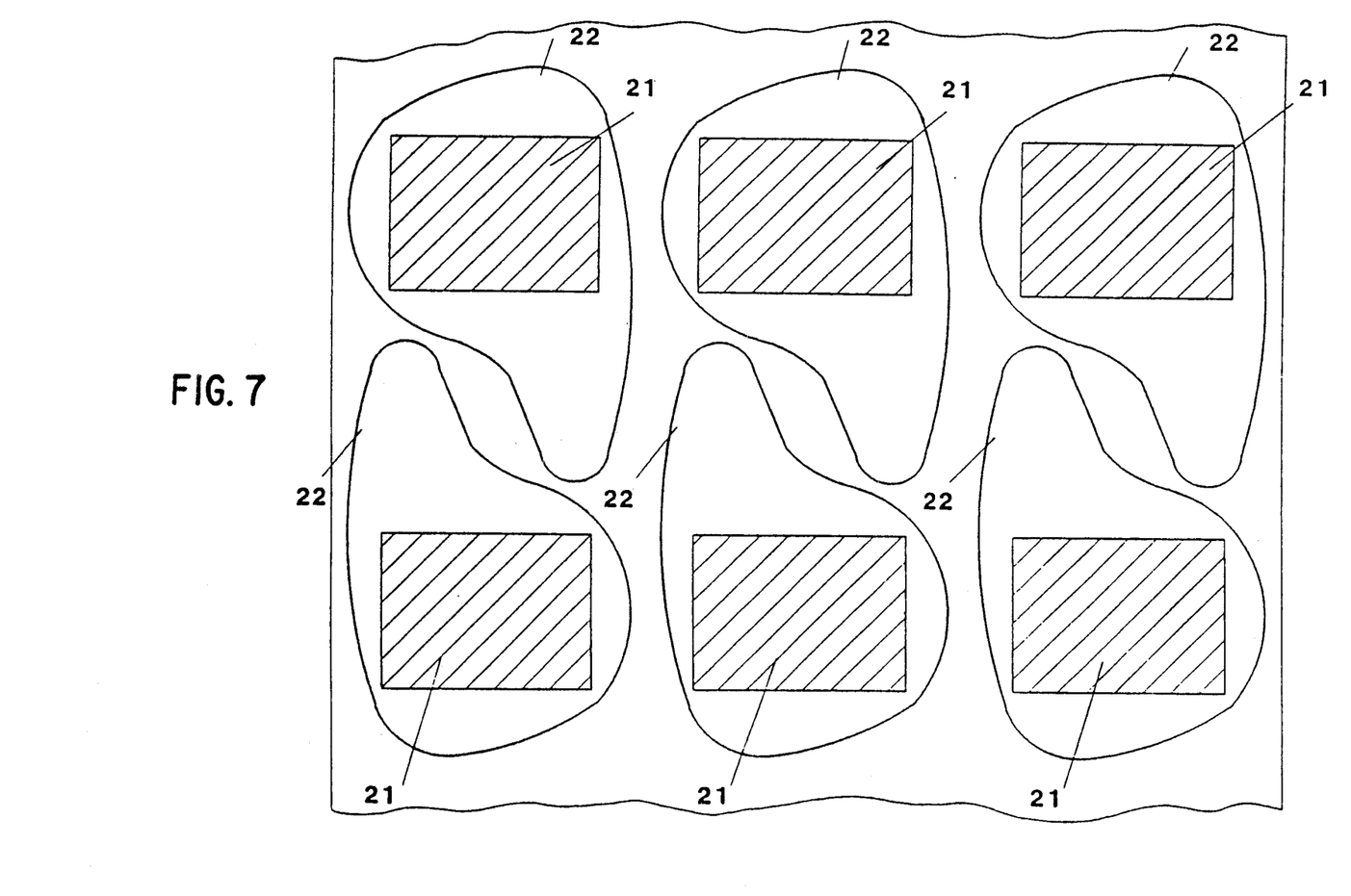
FIG. 7 shows an air bag filter part fabric as can be produced on a weaving machine with a dobby attachment, together with cutting patterns. It relates to Example 1.

After 15 cm has been woven, the weave design is partially altered to a 2/2 Panama. This alteration is not effected over the entire fabric width, only to segments starting 15 cm from the left-hand selvedge. As shown in FIG. 7, a total of three windows (21) are introduced across the width of the fabric in a 2/2 Panama weave. The windows measure 40 cm in width and 30 cm in length. The alteration to the plain basic weave is effected with the aid of a dobby. Following a further 45 cm of weaving, the entire weaving width is then reverted back to the basic plain weave. Following a further 90 cm of weaving, the weave pattern is switched back to the weaving of windows, and this operation is continued in accordance with these directions along the entire length of the fabric, although it is then advantageous, in the interests of tension equalization, to locate the windows in an offset arrangement.

The cut for the filter fabric of the air bag is made along lines 22. This ensures that in those areas in which the later seam will inevitably come to lie there is a tight fabric where there is no danger of the seam being ripped out in the event of the air bag function being released.

The air permeability of the plain-woven areas is 17 l/dm².min, whereas the window-like 2/2 Panama areas (21) have an air permeability of 50 l/dm².min.

EXAMPLE 2

Trial 1 was repeated, except that the gripper machine with dobby was replaced by a Jacquard machine.

Figure 8:
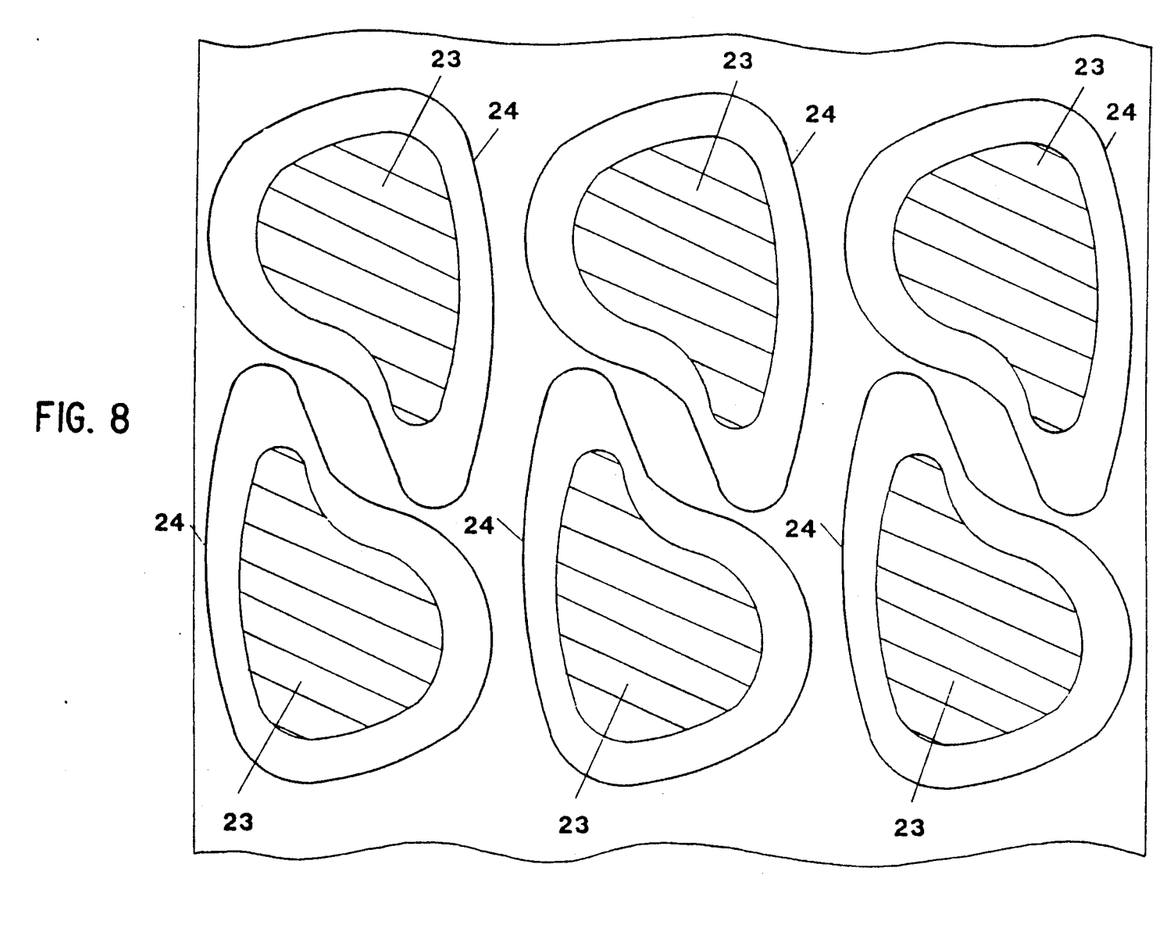
FIG. 8 shows an air bag filter part fabric as can be produced on a Jacquard machine, together with cutting patterns. It relates to Example 2.

FIG. 8 shows the introduction of windows (23) with higher air permeability through variation of the weave using a Jacquard machine. Compared with the use of a dobby, here the zones of higher air permeability can be efficiently adapted to the shape of the cutting pattern (along the lines marked 24) for the filter part of the air bag.

EXAMPLE 3

A 470-dtex 72-filament nylon 66 yarn is processed on a gripper loom into a plain-weave fabric. The total width of the fabric is 170 cm.

Figure 9:
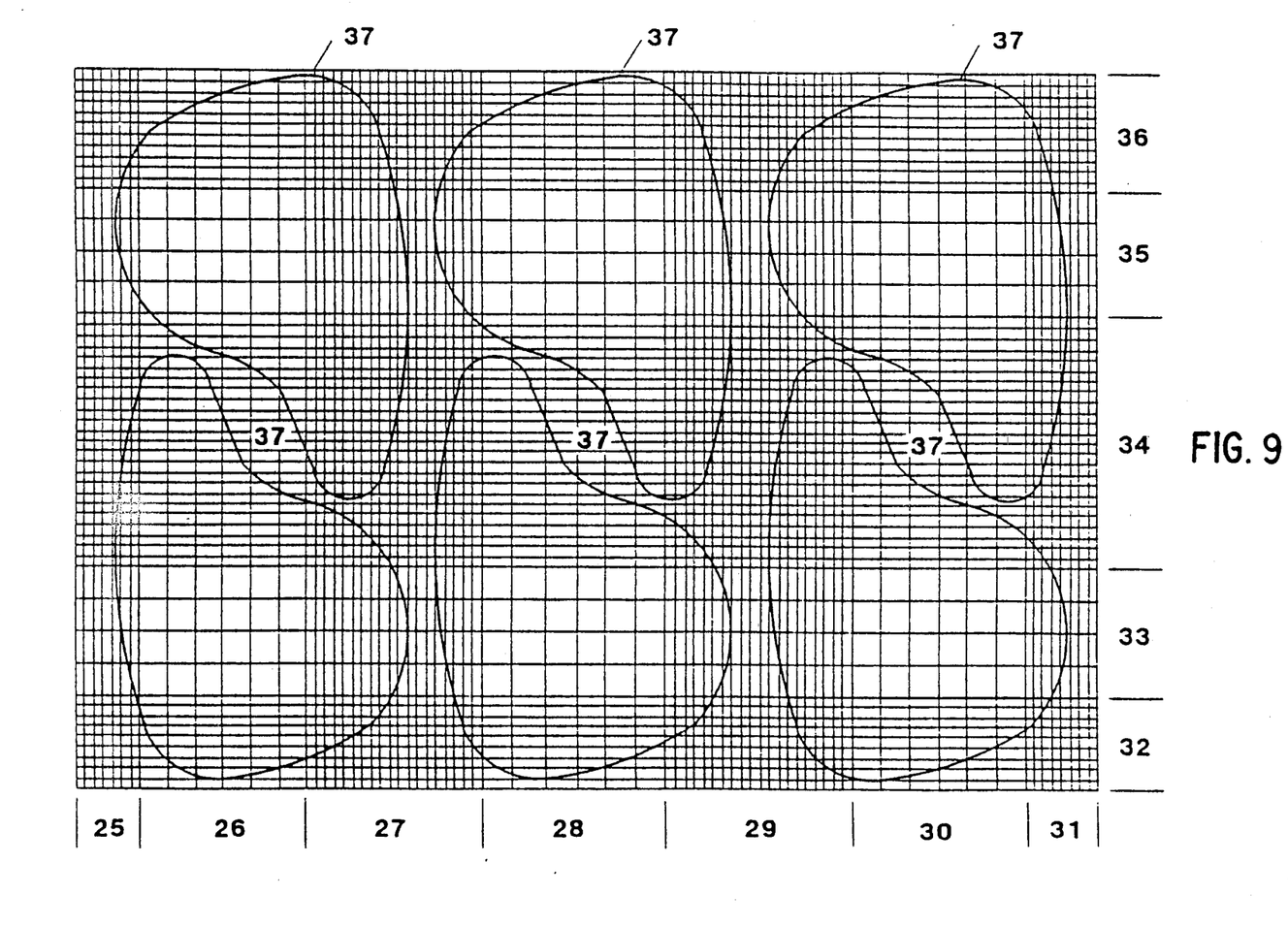
FIG. 9 shows an air bag filter part fabric as can be produced by varying the warp and weft setts, together with cutting patterns. It relates to Example 3.

A warp with varying numbers of ends per cm is used. The weave plan is depicted in FIG. 9.

Starting at the left-hand edge, the first yarn segment has a width of 10 cm and 19 ends/cm (25). This is followed by a segment 30 cm in width which contains 16 ends/cm (26). This in turn is followed by a segment having 19 ends/cm and a width of 30 cm (27). There then follow at intervals of 30 cm segments which are each 30 cm in width and contain respectively 16 ends/cm (28), 19 ends/cm (29) and 16 ends/cm (30), and at the edge over a width of 10 cm by a segment having 19 ends/cm (31).

Weft insertion is controlled electronically. First a segment 20 cm in length is introduced with 19 picks/cm (32). Then the weft insertion is altered over a length of 20 cm to 16 picks/cm (33). Then over a length of 60 cm the weft insertion reverts to 19 picks/cm (34). Thereafter at intervals of 30 cm the numbers of picks inserted are 16/cm (35) and 19/cm (36). The succession of higher and lower numbers of picks then repeats in similar fashion.

The result is, as explained earlier (see description of FIG. 4), the formation of zones of low air permeability, zones of medium air permeability and zones of high air permeability. The cuts for the filter part of the air bag along the line marked 37 are arranged in such a way that the edges of the cuts, which also form the later seam areas, are preferably located in the zones of low air permeability.

The air permeability is 17 l/dm$^2$.min in areas where warp segments of 19 ends/cm cross weft segments of 19 picks/cm. In areas where warp segments of 16 ends/cm cross weft segments of 16 picks/cm the air permeability is 90 l/dm$^2$.min. In areas of medium thread density (16 ends/cm crossing 19 picks/cm and 19 ends/cm crossing 16 picks/cm) the air permeability is 60 l/dm$^2$.min.

This process does not succeed completely in adapting the zones of low air permeability to the nonrectangular cutting patterns in such a way that the cut is in each case is located completely within the area of low air permeability. The later seam edge thus also lies to some extent in areas of high and medium air permeability. The process thus does not offer the uniformly high certainty with respect to the strength of the seam areas as the processes using a dobby machine (see Example 1) or a Jacquard machine (see Example 2 ). However, this process has the advantage that it can be carried out on any desired weaving machine and thus does not impose any restrictions with respect to suitable machinery.

What is claimed is:

1. A process for manufacturing an air bag fabric which is later to be cut to size, comprising weaving said fabric while varying at least one member selected from the group consisting of warp and weft sett and type of weave, independently or concurrently, to obtain a plurality of fabric zones of differing air permeability and differing cut-edge or seam strength.

2. A process according to claim 1, wherein said at least one member is varied in such a way that a particularly low air permeability is achieved at areas which will form a cut-edge or seam, and a higher air permeability is achieved in areas which will not form a cut-edge or seam.

3. A process according to claim 1, wherein said fabric is woven in a tight basic weave with window-like zones of higher air permeability and lower cut-edge or seam strength by varying the type of weave such that the tight basic weave is in the cut-edge and seam areas and remains intact when the fabric is cut to size.

4. A process according to claim 2, wherein a dobby machine is used to weave said higher air permeability areas.

5. A process according to claim 2, wherein a tappet machine is used to weave said higher air permeability areas.

6. A process according to claim 2, wherein a Jacquard machine is used to weave said higher air permeability areas.

7. A process according to claim 1, wherein said air bag fabric has a plain weave and said fabric zones are obtained by selecting a sequence of warp and weft threads such that:
   many warp and weft threads cross in areas which have low air permeability and high cut-edge or seam strength;
   few warp and weft threads cross in areas which have higher air permeability and lower cut-edge or seam strength; and
   few warp and many weft or many warp and few weft threads cross in areas which have medium air permeability and medium cut-edge or seam strength.

8. A process according to claim 1, wherein, at a time, only one fabric zone of lower air permeability to be later cut out is arranged in such a way that an outline of the zone forms a particular cutting pattern which defines the edge at which the fabric is to be cut.

9. A process according to claim 2, further comprising cutting said fabric in said areas of low air permeability.

10. A finished part of an air bag, comprising a plurality of air bag zones wherein said air bag zones have different air permeabilities and said finished part is constructed of an air bag fabric manufactured according to claim 1.

11. A filter part of an air bag comprising an air bag fabric manufactured according to claim 1.

12. An air bag comprising a filter part according to claim 11.

13. An air bag system comprising an air bag according to claim 12.

* * * * *

UNITED STATES PATENT AND TRADEMARK OFFICE
CERTIFICATE OF CORRECTION

PATENT NO. : 5,131,434
DATED : July 21, 1992
INVENTOR(S) : Wolf R. KRUMMHEUER et al It is certified that error appears in the above-identified patent and that said Letters Patent is hereby corrected as shown below:

Col. 1,   line 10, change "1/dm$^2$.min" to --1/dm$^2$·min--;

line 45, change "1/dm$^2$.min" to --1/dm$^2$·min--;

Col. 2,   line 33, change "abovedescribed" to --above-described--.

Col. 3,   line 33, change "3/1-twill-woven" to --3/1 twill-woven--.

Col. 7,   line 34, change "1/dm$^2$.min," to --1/dm$^2$·min,--.

Col. 8,   line 56, change "1/dm$^2$.min," to --1/dm$^2$·min,--;

line 57, change "1/dm$^2$.min" to --1/dm$^2$·min--.

Col. 10,  line 35, change "1/dm$^2$.min" to --1/dm$^2$·min--;

line 39, change "1/dm$^2$.min" to --1/dm$^2$·min--;

line 41, change "1/dm$^2$.min" to --1/dm$^2$·min--.

Signed and Sealed this

Twelfth Day of October, 1993

*Attest:*

BRUCE LEHMAN

*Attesting Officer*     Commissioner of Patents and Trademarks